United States Patent
Nakada

(10) Patent No.: US 7,180,266 B2
(45) Date of Patent: Feb. 20, 2007

(54) CAPACITY ADJUSTMENT APPARATUS FOR BATTERY PACK AND CAPACITY ADJUSTMENT METHOD FOR BATTERY PACK

(75) Inventor: Yuji Nakada, Tokyo (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 11/080,834

(22) Filed: Mar. 16, 2005

(65) Prior Publication Data

US 2005/0212482 A1    Sep. 29, 2005

(30) Foreign Application Priority Data

Mar. 23, 2004    (JP) .............................. 2004-084757

(51) Int. Cl.
*H02J 7/00* (2006.01)
(52) U.S. Cl. ..................................................... 320/132
(58) Field of Classification Search ................ 320/132, 320/136, 120, 104; 180/65.2; 318/140
See application file for complete search history.

(56) References Cited

U.S. PATENT DOCUMENTS

| | | | |
|---|---|---|---|
| 5,998,969 A * | 12/1999 | Tsuji et al. ................. | 320/132 |
| 6,160,380 A * | 12/2000 | Tsuji et al. ................. | 320/132 |
| 6,417,648 B2 * | 7/2002 | Suzuki et al. ............... | 320/136 |
| 6,932,174 B2 * | 8/2005 | Hirata et al. ............... | 180/65.2 |
| 7,019,489 B2 * | 3/2006 | Nakada ...................... | 320/104 |
| 2004/0018419 A1 * | 1/2004 | Sugimoto et al. ............ | 429/61 |
| 2005/0212481 A1 * | 9/2005 | Nakada ...................... | 320/116 |
| 2005/0212487 A1 * | 9/2005 | Sodeno ....................... | 320/132 |

FOREIGN PATENT DOCUMENTS

| | | | |
|---|---|---|---|
| EP | 1289096 | * | 6/2003 |
| JP | 09084205 | * | 3/1997 |
| JP | 10-322925 A | | 12/1998 |
| JP | 11150873 | * | 6/1999 |

\* cited by examiner

*Primary Examiner*—Pia Tibbits
(74) *Attorney, Agent, or Firm*—Foley & Lardner LLP

(57) ABSTRACT

A bypass engaging voltage is set to a relatively high value and a target charging rate for a capacity adjustment is set higher than the target charging rate set in a regular charge/discharge mode when executing the capacity adjustment for individual cells by employing capacity adjustment circuits that discharge the corresponding cells when their voltages exceed the specific bypass engaging voltage.

5 Claims, 7 Drawing Sheets

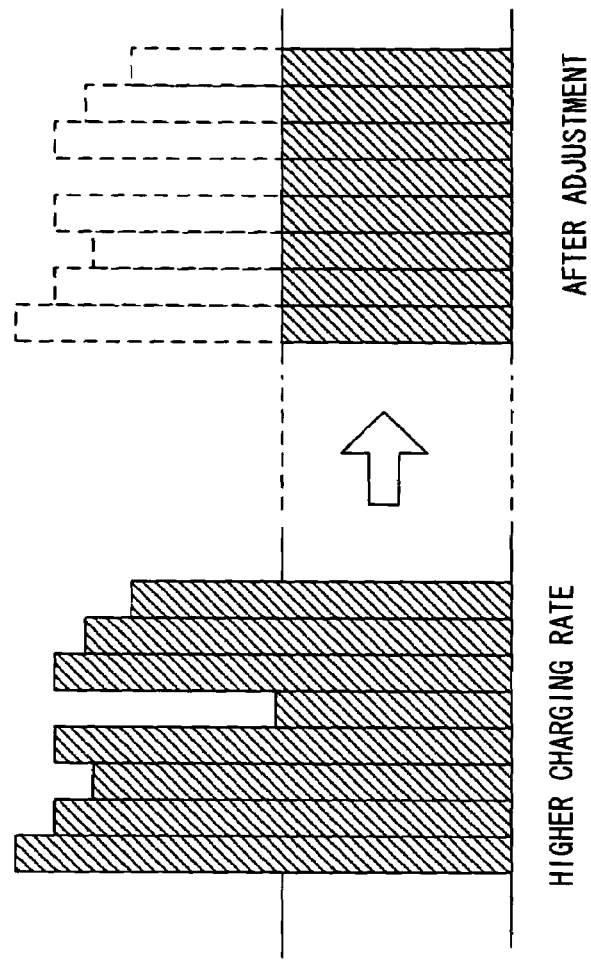
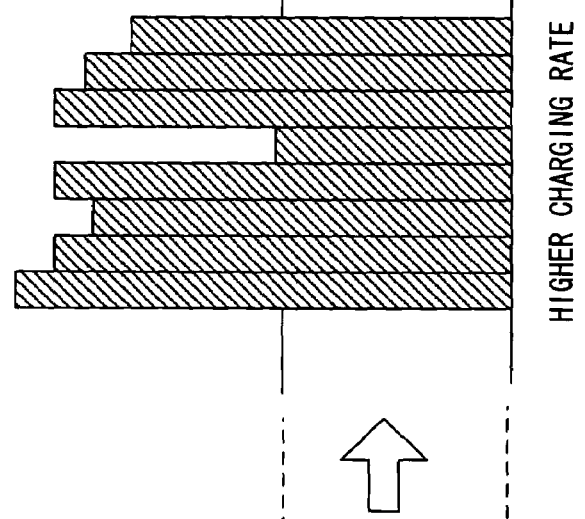
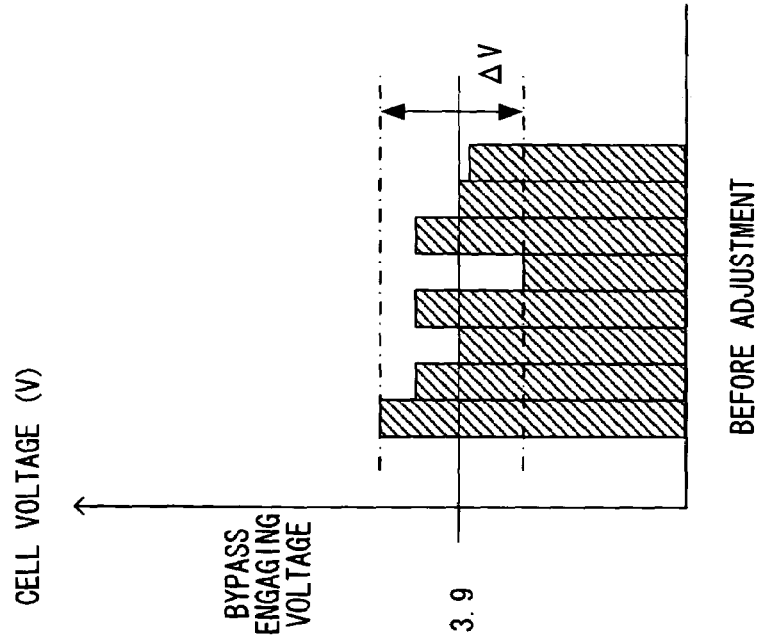

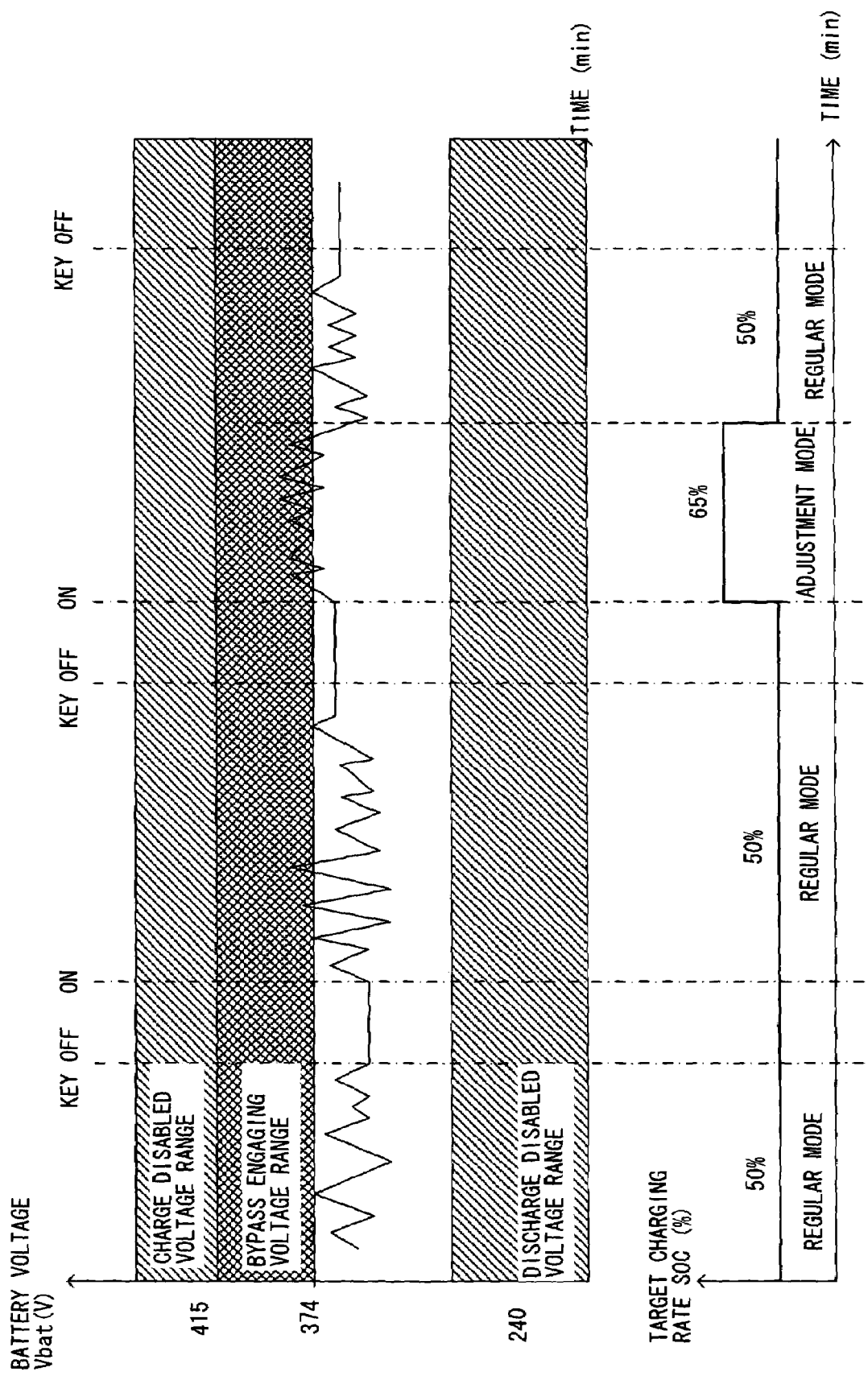

CAPACITY ADJUSTMENT APPARATUS FOR BATTERY PACK AND CAPACITY ADJUSTMENT METHOD FOR BATTERY PACK

BACKGROUND OF THE INVENTION

1. Field of the Invention

The present invention relates to a capacity adjustment apparatus and a capacity adjustment method to be adopted in conjunction with a battery pack constituted with a plurality of cells.

2. Description of Related Art

There is an apparatus known in the related art that detects open circuit voltages of a plurality of cells constituting a battery pack and adjusts the capacities of the cells by individually discharging the cells based upon the voltage distribution of the detected open circuit voltages (see Japanese Laid Open Patent Publication No. H10-322925).

SUMMARY OF THE INVENTION

However, since the apparatus in the related art discharges the cells in reference to the lowest voltage among the detected cell voltages, a problem arises when there is a significant variance among the voltages in that the electrical charges at the other cells whose voltages have not become low are discharged wastefully.

A battery pack capacity adjustment apparatus for a battery pack constituted by connecting in series a plurality of cells includes capacity adjustment circuits provided in correspondence to each of the plurality of cells to execute capacity adjustment by discharging the corresponding cell when a voltage at the corresponding cell exceeds a predetermined bypass engaging voltage, a capacity adjustment decision-making device that makes a decision as to whether or not capacity adjustment needs to be executed for the battery pack and a target charging rate changing device that raises a target charging rate for the battery pack from a first target charging rate to a second target charging rate when the capacity adjustment decision-making device determines that the capacity adjustment needs to be executed for the battery pack.

A battery pack capacity adjustment method for executing capacity adjustment for a plurality of cells constituting a battery pack by utilizing capacity adjustment circuits each provided in correspondence to one of the plurality of cells to discharge the corresponding cell when a voltage at the corresponding cell exceeds a predetermined bypass engaging voltage includes steps for making a decision as to whether or not capacity adjustment needs to be executed for the battery pack, and raising a target charging rate for the battery pack from a first target charging rate to a second target charging rate when the capacity adjustment of the battery pack is determined to be necessary.

BRIEF DESCRIPTION OF THE DRAWINGS

FIGS. 8A to 8C show changes occurring in the voltages at the individual cells when the capacity adjustment is executed by the battery pack capacity adjustment apparatus in the embodiment; and FIG. 9 shows the relationship between the change occurring over time in the total voltage $V_{bat}$ at the battery pack and the target charging rate.

DETAILED DESCRIPTION OF THE PREFERRED EMBODIMENT

Figure 1:
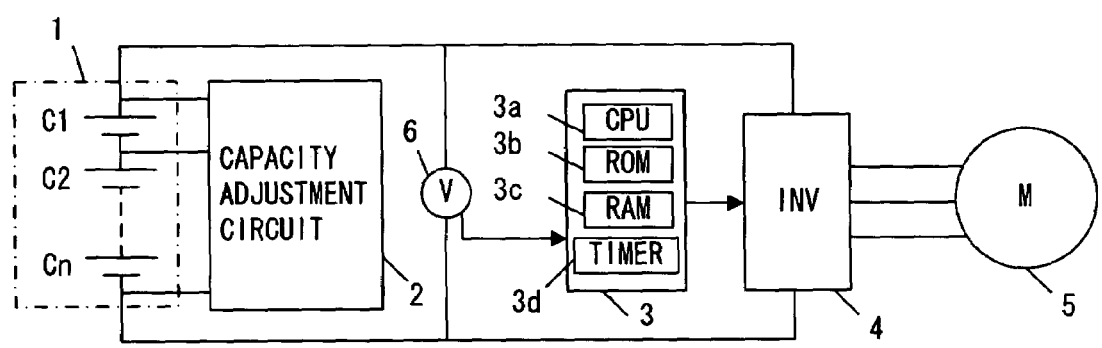
FIG. 1 shows the system configuration of an embodiment in which the battery pack capacity adjustment apparatus according to the present invention is adopted in a hybrid car.

FIG. 1 shows the system configuration of an embodiment in which the battery pack capacity adjustment apparatus according to the present invention is adopted in a hybrid car. A battery pack 1 is constituted by connecting in series n (n: positive integer) cells C1 to Cn. An AC voltage obtained by converting at an inverter 4 a DC voltage of the battery pack 1 is applied to a three-phase AC motor 5 which is a traveling drive source of the vehicle. A control unit 3, which includes a CPU 3a, a ROM 3b, a RAM3c and a timer 3d, charges and discharges the battery pack 1 by controlling the inverter 4. A voltage sensor 6 detects the total voltage $V_{bat}$ at the battery pack 1 and outputs the detected total voltage to the control unit 3.

Figure 2:
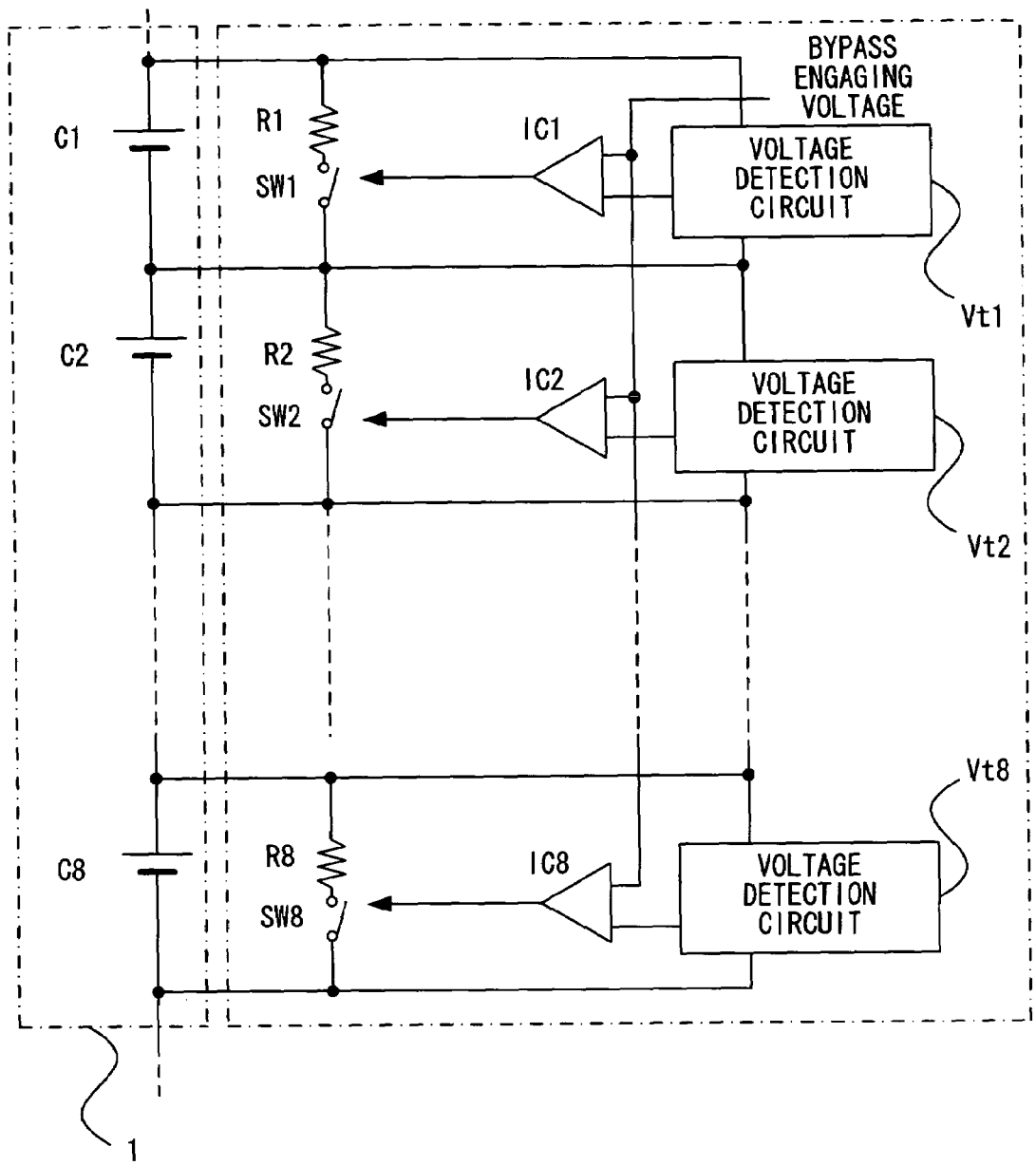
FIG. 2 shows in detail the structure adopted in the capacity adjustment circuit (bypass circuit)

FIG. 2 shows in detail a capacity adjustment circuit (bypass circuit) 2. In order to simplify the explanation, it is assumed that the battery pack 1 is constituted with 8 cells C1 to C8. The capacity adjustment circuit 2 includes voltage detection circuits Vt1 to Vt8, voltage comparators IC1 to IC8, bypass resistors R1 to R8 and switches SW1 to SW8. The voltage detection circuits Vt1 to Vt8, each provided in conjunction with one of the cells, detect the voltages at the corresponding cells C1 to C8.

The voltage comparators IC1 to IC8 compare the cell voltages detected by the voltage detection circuits Vt1 to Vt8 respectively with a predetermined bypass engaging voltage $V_{bps}$ (threshold voltage $V_{bps}$) and output the results of the comparison to the corresponding switches SW1 to SW8. If a signal indicating that the cell voltage is higher than the bypass engaging voltage $V_{bps}$ is input from any of the voltage comparators 1C1 to 1C8, the corresponding switch SW1 to SW8 enters an ON state. If, for instance, the switch SW1 is turned on, a current flows from the cell C1 via the bypass resistor R1 connected in series with the switch SW1. Namely, if a cell voltage exceeds the bypass engaging voltage $V_{bps}$, the cell is discharged via the corresponding bypass resistor. As a result, the extent of variance among the voltages at the individual cells is reduced.

Figure 3:
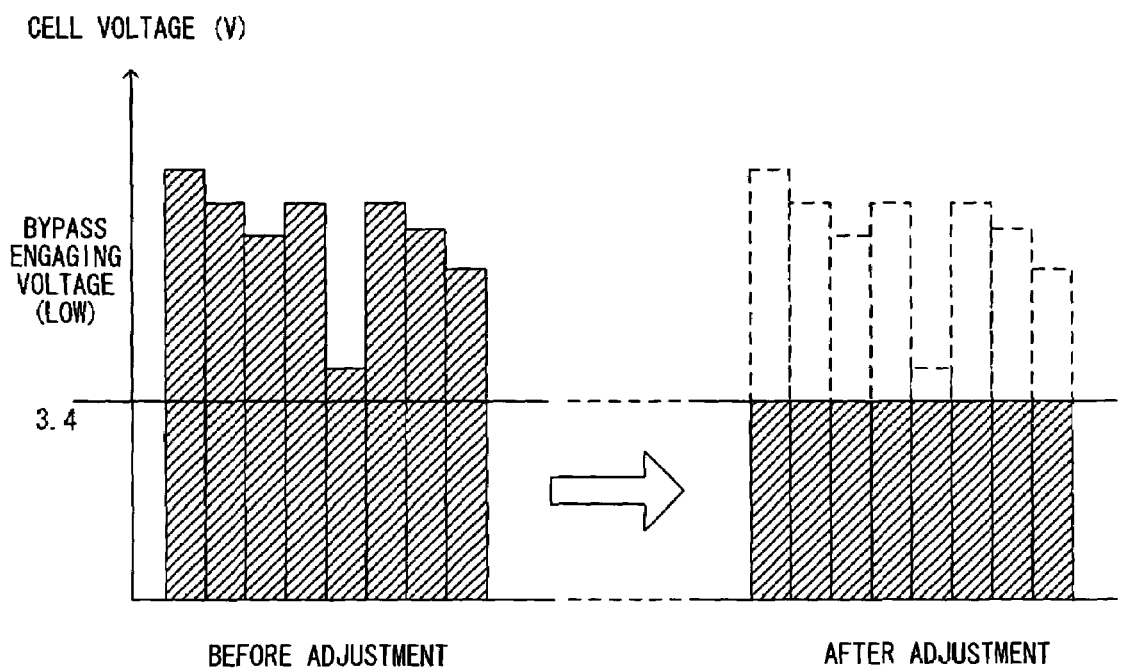
FIG. 3 shows the pre-capacity adjustment variance among the voltages at the individual cells and the post-capacity adjustment voltage variance manifesting when the bypass engaging voltage is set to a low value (3.4V)

FIG. 3 shows the pre-capacity adjustment voltage variance among the individual cells and the post-capacity adjustment voltage variance manifesting when the bypass engag ing voltage is set to a low value (3.4V). As shown in FIG. 3, while the voltages at the individual cells are adjusted so as to achieve uniformity through the capacity adjustment, a great deal of power is discharged, resulting in a significant energy loss when the bypass engaging voltages set to a low value.

Accordingly, the bypass engaging voltage $V_{bps}$ is set to a considerably higher value in the battery pack capacity adjustment apparatus in the embodiment. In this example, the bypass engaging voltage $V_{bps}$ is set to a value (e.g., 3.9V) which is higher than the average of the voltages at the individual cells detected when they are charged/discharged in a regular charge/discharge mode (with the target charging rate at 50%).

Figure 4:
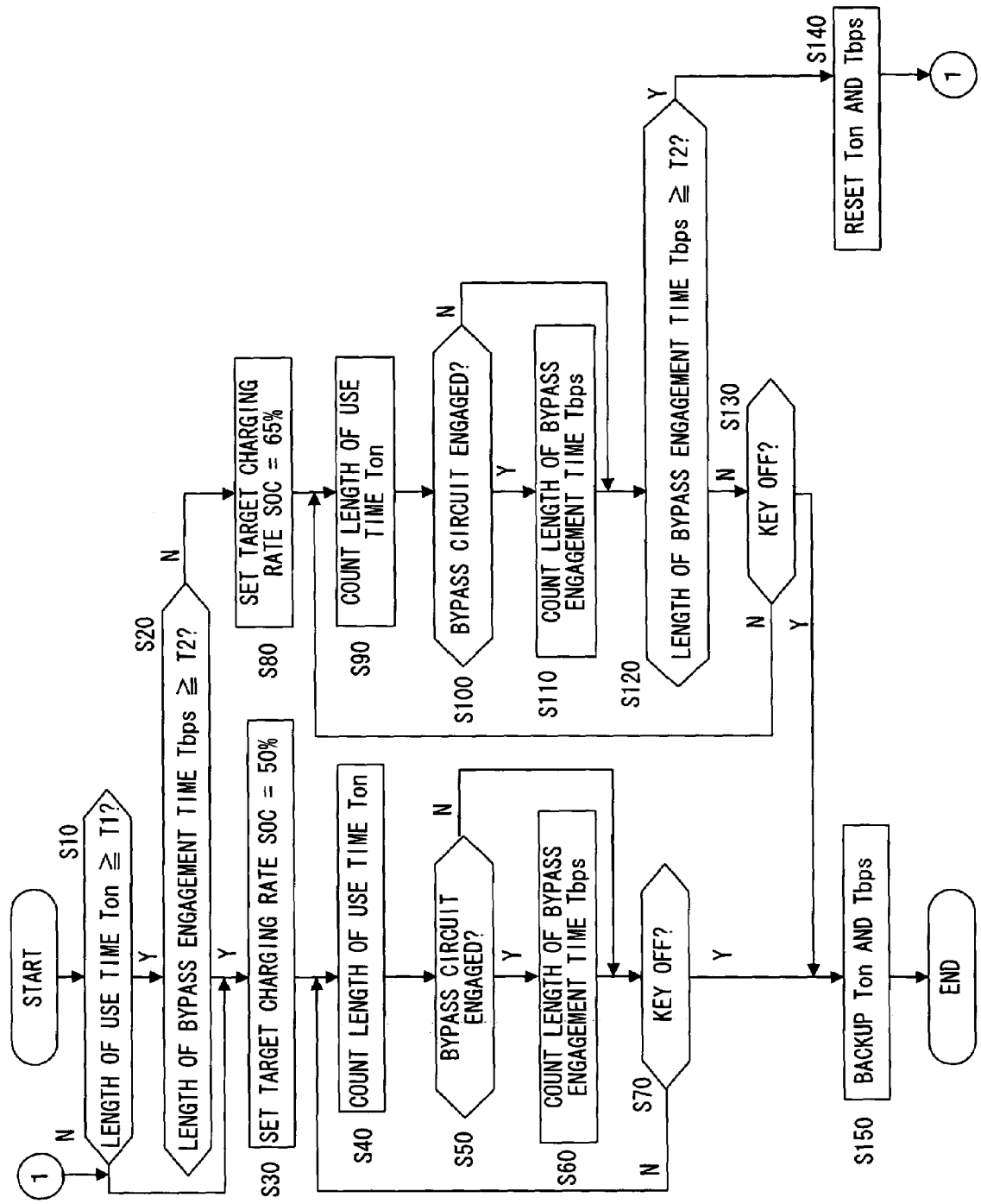
FIG. 4 presents a flowchart of the capacity adjustment procedure executed by the battery pack capacity adjustment apparatus in the embodiment.

FIG. 4 presents a flowchart of the capacity adjustment procedure executed in the battery pack capacity adjustment apparatus in the embodiment. The processing, which starts in step S10, is executed by the CPU 3a in the control unit 3.

In step S10, a decision is made as to whether or not the length of time $T_{on}$ over which the hybrid car having installed therein the battery pack capacity adjustment apparatus in the embodiment has been in use is equal to or greater than a predetermined length of time T1. An explanation is given on how the predetermined length of time T1 should be set, in reference to FIGS. 5 and 6.

Figure 5:
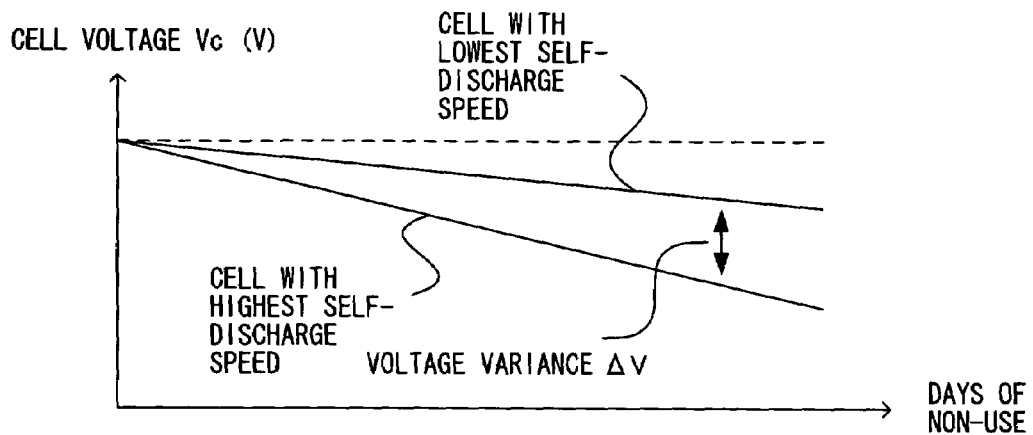
FIG. 5 shows changes occurring in the cell voltages when the battery pack is left unused.

FIG. 5 shows changes occurring in the cell voltages when the battery pack 1 is left unused. As FIG. 5 indicates, the voltage difference ΔV between the voltage at a cell with a low self-discharge speed and the voltage at a cell with a higher self-discharge speed increases as the battery pack is left unused longer (as it is left unused over a greater number of days).

Figure 6:
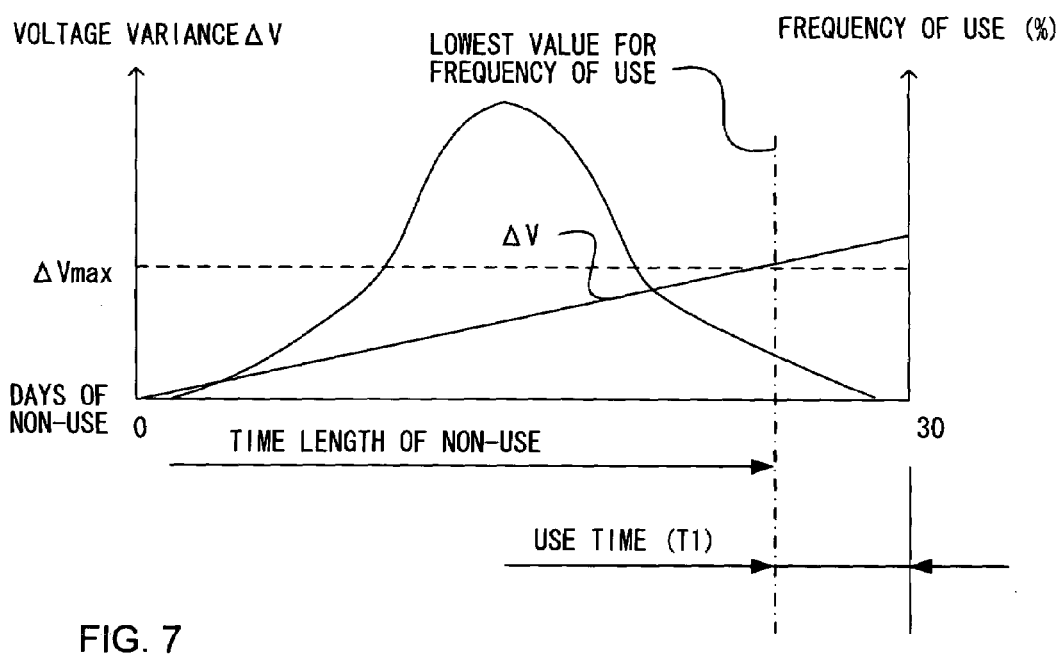
FIG. 6 shows the relationship between the number of days over which the battery pack is left unused and the voltage variance $\Delta V$ along with the frequency with which the vehicle is used over a one-month (about 30-day) period.

FIG. 6 shows the relationship between the number of days over which the battery pack is left unused and the voltage variance ΔV, along with the frequency with which the vehicle is used over a one-month (about 30-day) period. As explained above in reference to FIG. 5, the voltage variance ΔV among the cells constituting the battery pack 1 increases as the battery pack is left unused over a greater number of days. In addition, the vehicle use frequency based upon statistical data of the frequencies with which a plurality of users use their vehicles achieves a distribution close to the normal distribution, as shown in FIG. 6. Namely, most users use their vehicles approximately 15 days out of 30 and the number of users at frequencies higher than 15 days falls off. Since the voltage variance ΔV among the individual cells is at its largest when the vehicle use frequency, i.e., the battery pack use frequency, is at its lowest (when the frequency with which the vehicle is left unused is at its highest), the number of days of non-use which achieves the lowest vehicle use frequency is determined based upon the statistical results presented in FIG. 6. The length of use time T1 is calculated in advance by subtracting the number of days of non-use from 30 and the length of use time T1 thus calculated is stored in the RAM 3c.

In addition, the length of vehicle use time $T_{on}$ is the cumulative value representing the overall length of time over which the hybrid car has been in an ON state, and the length of vehicle use time $T_{on}$ is stored into the RAM 3c when the key switch (not shown) is turned off, as detailed later. Accordingly, the CPU 3a reads out the length of vehicle use time $T_{on}$ and the length of use time T1 stored in the RAM 3c and makes a decision as to whether or not $T_{on} \geq T1$ is true. The operation proceeds to step S20 if the length of vehicle use time Ton is equal to or greater than the predetermined length of time T1, whereas the operation proceeds to step S30 if the length of vehicle use time $T_{on}$ is smaller than the predetermined length of time T1.

Figure 7:
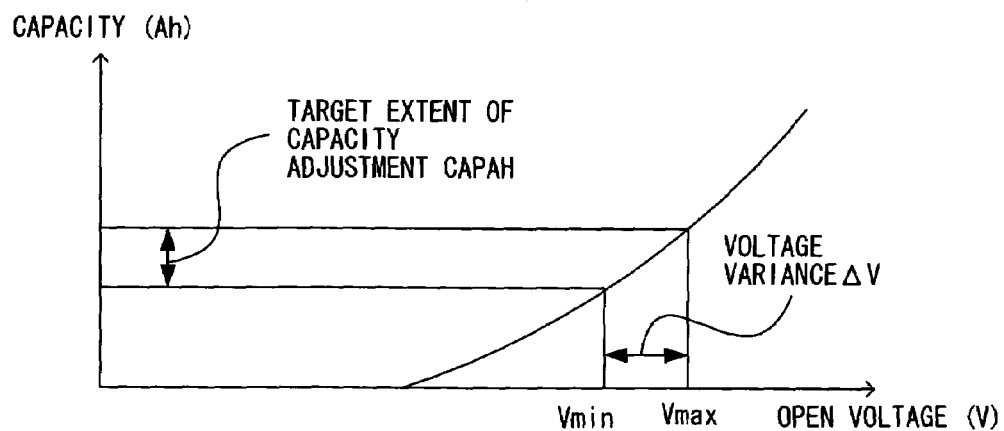
FIG. 7 shows the relationship between the cell open circuit voltage and the cell capacity.

In step S20, a decision is made as to whether or not the length of time $T_{bps}$ over which the bypass function has been engaged exceeds a predetermined length of time T2. The method for setting the predetermined length of time T2 is now explained in reference to FIG. 7. FIG. 7 shows the relationship between the cell open circuit voltage (V) and the cell capacity (Ah). First, based upon the minimum value of the use frequency indicated in FIG. 6, the maximum voltage variance $\Delta V_{max}$ ($V_{max}-V_{min}$) is determined. It is to be noted that $V_{max}$ represents the voltage value of the highest cell voltage among the various cells and that $V_{min}$ represents the voltage value of the lowest cell voltage among the various cells. Then, based upon $\Delta V_{max}$ thus determined and the open circuit voltage-capacity curve shown in FIG. 7, the target extent for the capacity adjustment CAPAH is calculated.

With R representing the bypass resistance, the corresponding bypass current $I_{bps}$ can be calculated as indicated in (1) below.

$$I_{bps}(A)=V_{bps}(V)/R(\Omega) \tag{1}$$

The predetermined length of time T2 can be calculated as indicated in (2), based upon the bypass current $I_{bps}$ determined by using expression (1) and the target extent for the capacity adjustment CAPAH.

$$T2(\min)=CAPAH(Ah)/I_{bps}(A)\times 60(\min) \tag{2}$$

Namely, the predetermined length of time T2 represents the length of time required to execute an adjustment in order to eliminate the voltage variance $\Delta V_{max}$ when the length of use time over the one-month (30-day) period is the smallest.

The length of time $T_{bps}$ over which the bypass function has been engaged is the cumulative value representing the overall length of time over which the capacity adjustment circuit (bypass circuit) 2 has been engaged in operation, and is stored in the RAM 3c when the key switch (not shown) is turned off, as detailed later. Accordingly, the CPU 3a reads out the length of time of bypass function engagement time $T_{bps}$ stored in the RAM 3c and makes a decision as to whether or not the length of bypass function engagement time $T_{bps}$ is equal to or greater than T2. The operation proceeds to step S30 if the length of bypass function engagement time $T_{bps}$ is determined to be equal to or greater than the predetermined length of time t2, whereas the operation proceeds to step S80 if the length of bypass function engagement time $T_{bps}$ is determined to be less than the predetermined length of time T2.

The processing executed in steps S30 through S70 is regular charge/discharge mode processing. Namely, if the length of vehicle use time $T_{on}$ is less than the predetermined length of time T1 and the length of bypass function engagement time $T_{bps}$ is equal to or greater than the predetermined length of time T2, it is judged that the extent of the variance among the cell voltages is insignificant and thus the capacity adjustment does not need to be executed in a capacity adjustment mode to be detailed later. Accordingly, charge/discharge is executed in the regular charge/discharge mode.

In step S30, the target charging rate (target SOC) is set to 50% before the operation proceeds to step S40. In step S40, the timer 3d is engaged to start a cumulative count of the length of vehicle use time $T_{on}$. The timer 3d executes the count by counting up on the length of use time $T_{on}$ stored in the RAM 3c.

In step S50 following step S40, a decision is made as to whether or not the capacity adjustment circuit 2 is currently engaged in operation. This decision is made based upon the total voltage $V_{bat}$ at the battery pack 1 detected by the voltage sensor 6. Namely, it is judged that the capacity adjustment circuit 2 is engaged in operation if the relationship expressed in (3) below is satisfied, whereas the capacity adjustment circuit 2 is judged not to be engaged in operation if the relationship in (3) is not satisfied.

$$V_{bat} \geq V_{bps} \times n \text{ (}n\text{: number of cells)} \tag{3}$$

The operation proceeds to step S60 upon judging that the capacity adjustment circuit is engaged in operation, whereas the operation proceeds to step S70 upon judging that it is not engaged in operation.

In step S60, the timer 3d is engaged to start a cumulative count of the length of bypass function engagement time $T_{bps}$. The timer 3d executes the count by counting up on the length of bypass function engagement time $T_{bps}$ stored in the RAM 3c. Once the cumulative count of the length of bypass function engagement time $T_{bps}$ starts, the operation proceeds to step S70. In step S70, a decision is made as to whether or not the key switch (not shown) has been turned off. The operation proceeds to step S150 if the key switch is determined to have been turned off, whereas the operation returns to step S40 if it is decided that the key switch has not been turned off.

The processing executed in steps S80 through S140 is capacity adjustment mode processing. In step S80, the target charging rate is set to 65%. As explained earlier, the bypass engaging voltage is set to a value (3.9V) higher than the cell voltages resulting from a charge executed in reference to the normal target charging rate (50%). In order to charge the cells so as to allow the cell voltages to reach the bypass engaging voltage (3.9V), the charging rate (SOC=65%) at which the cell open circuit voltages become equal to 3.9V is set for the target charging rate in the capacity adjustment mode. Once the target charging rate is set to 65%, the operation proceeds to step S90.

In step S90, the timer 3d starts a cumulative count of the length of vehicle use time $T_{on}$, and then the operation proceeds to step S100. In step S100, a decision is made as to whether or not the capacity adjustment circuit 2 is engaged in operation. The decision as to whether or not the capacity adjustment circuit 2 is engaged in operation is made as in step S50. The operation proceeds to step S110 upon judging that the capacity adjustment circuit 2 is engaged in operation, whereas the operation proceeds to step S120 upon judging that the capacity adjustment circuit 2 is not engaged in operation.

In step S110, the timer 3d starts a cumulative count of the length of bypass function engagement time $T_{bps}$, and then the operation proceeds to step S120. In step S120, a decision is made as to whether or not the length of bypass function engagement time $T_{bps}$ has become equal to or greater than the predetermined length of time T2. If it is decided that the length of bypass function engagement time $T_{bps}$ has become equal to or greater than the predetermined length of time T2, the capacity adjustment is judged to have been completed and the operation proceeds to step S140, whereas if it is decided that the length of bypass function engagement is less than the predetermined length of time T2, the capacity adjustment is judged to be incomplete and the operation proceeds to step S130.

In step S130, a decision is made as to whether or not the key switch (not shown) has been turned off. The operation proceeds to step S150 if the key switch is determined to have been turned off, whereas the operation returns to step S90 if it is decided that the key switch has not been turned off. In step S140, on the other hand, the length of vehicle use time $T_{on}$ and the length of bypass function engagement time $T_{bps}$ are both reset and then the operation proceeds to step S30 to execute the regular charge/discharge mode processing. In step S150, the length of vehicle use time $T_{on}$ and the length of bypass function engagement time $T_{bps}$ are stored in the RAM 3c, thereby ending the entire processing.

FIGS. 8A to 8C show changes occurring in the cell voltages as the capacity adjustment is executed by adopting the battery pack capacity adjustment apparatus in the embodiment. FIG. 8A shows the pre-capacity adjustment cell voltage variance. The voltage difference between the lowest cell voltage and the highest cell voltage is ΔV. FIG. 8B shows the cell voltages achieved through a charge operation executed by setting the target charging rate to 65% in the capacity adjustment mode. Since the charge operation is executed by setting the target charging rate to a higher level relative to the target charging rate in the regular charge/discharge mode, the voltages at the individual cells become higher than the bypass engaging voltage $V_{bps}$. By executing the capacity adjustment in this state, the voltages at the individual cells are controlled to a level equal to the bypass engaging voltage $V_{bps}$, as indicated in FIG. 8C. It is to be noted that even if there is a cell with a voltage that is still under the bypass engaging voltage after the charge, the variance in the voltages among the individual cells can be reduced by repeatedly executing charge processing with the target charging rate set to 65%.

FIG. 9 shows the relationship between the change occurring over time in the total voltage $V_{bat}$ at the battery pack 1 and the target charging rate. While the key switch (not shown) is in an ON state, the total voltage $V_{bat}$ at the battery pack 1 fluctuates through charge/discharge of the battery pack 1. Since the bypass engaging voltage $V_{bps}$ is set to a relatively high value as explained earlier, only cells with voltages exceeding the bypass engaging voltage $V_{bps}$ are discharged via the corresponding bypass resistors and cells with voltages lower than the bypass engaging voltage do not undergo the capacity adjustment in the regular charge/discharge mode.

As has been explained in reference to the flowchart presented in FIG. 4, the capacity adjustment is judged to be necessary and is executed in the capacity adjustment mode if the length of use time $T_{on}$ is equal to or greater than the predetermined length of time T1 and the length of bypass function engagement time $T_{bps}$ is less than the predetermined length of time T2. Namely, the target charging rate set at 50% in the regular charge/discharge mode is raised to 65%. As a result, the rate at which the total voltage $V_{bat}$ at the battery pack 1 reaches the bypass engaging voltage range increases. In other words, with a greater number of cells with voltages thereof exceeding the bypass engaging voltage $V_{bps}$, the capacity adjustment circuit 2 is engaged in the capacity adjustment so as to reduce the voltage variance among the individual cells.

The battery pack capacity adjustment apparatus achieved in the embodiment, which executes the capacity adjustment by raising the target charging rate for the battery pack from a first target charging rate, i.e., 50%, to a second target charging rate, i.e., 65%, when the battery pack capacity adjustment is judged to be necessary, minimizes wasteful discharge during the capacity adjustment. In addition, since it utilizes a capacity adjustment circuit that discharges cells with the voltages thereof exceeding the bypass engaging voltage, the capacity adjustment apparatus can be manufactured at lower cost compared to an apparatus that employs a microcomputer to control the discharge of the individual cells.

The bypass engaging voltage at which the capacity adjustment circuit 2 is engaged in the capacity adjustment is set to a value higher than the average of the individual cell voltages achieved by charging/discharging the battery pack at the first target charging rate in the regular charge/discharge mode and, at the same time, equal to or lower than the average of the individual cell voltages achieved by charging/discharging the battery pack at the second target charging rate in the capacity adjustment mode. Thus, the capacities of the individual cells can be adjusted with a high degree of reliability while minimizing the wasteful discharge during the capacity adjustment. As explained earlier in reference to FIG. 3, the electrical charges at cells with higher voltages are wastefully discharged if the bypass engaging voltage is set to a low level.

In addition, if the bypass engaging voltage alone is set to a high level and the target charging rate remains unchanged for the capacity adjustment, the likely presence of cells whose voltages do not reach the bypass engaging voltage will result in a significant voltage variance among the individual cells even after the capacity adjustment is executed based upon the bypass engaging voltage. However, the battery pack capacity adjustment apparatus in the embodiment, which sets the bypass engaging voltage to a relatively high value and also raises the target charging rate for the capacity adjustment, minimizes the voltage variance among the individual cells with a high degree of reliability.

The battery pack capacity adjustment apparatus in the embodiment judges that the battery pack capacity adjustment is necessary due to insufficient capacity adjustment when the length of time over which the battery pack has been in use is equal to or greater than a first predetermined length of time and the length of time over which the capacity adjustment circuit has been engaged in the capacity adjustment is less than a second predetermined length of time, i.e., when the ratio of the length of time over which the capacity adjustment circuit has been engaged in the capacity adjustment to the length of time over which the battery pack has been in use is equal to or lower than a predetermined ratio. As a result, the capacity adjustment is executed in an optimal manner under circumstances in which the capacity adjustment is determined to be necessary, to achieve highly effective use of the power in the battery pack.

In addition, the battery pack capacity adjustment apparatus in the embodiment determines the target extent for capacity adjustment CAPAH and executes the capacity adjustment by calculating the length of capacity adjustment time T2 based upon the extent of capacity adjustment CAPAH having been determined. As a result, the capacity adjustment is executed by raising the target charging rate only over the length of capacity adjustment time T2.

The present invention is not limited to the embodiment explained above. For instance, while the target charging rate is set to 50% in the regular charge/discharge mode and is set to 65% in the capacity adjustment mode in the explanation provided above, values other than those may be adopted in conjunction with the present invention. In addition, while the second target charging rate set in the capacity adjustment mode is equal to the charging rate corresponding to the cell open voltage of 3.9V, it may instead be set to a charging rate corresponding to a higher voltage than the bypass engaging voltage (3.9V in the embodiment). In such a case, as the battery pack 1 is charged at the second target charging rate, the cell voltages at an even greater number of cells exceed the bypass engaging voltage and thus, an even higher degree of efficiency is achieved in the capacity adjustment. However, setting the second target charging rate to an excessively high value will result in a greater quantity of electrical charge being discharged during the capacity adjustment, and for this reason, it is desirable to set the second target charging rate to a value only slightly higher than the charging rate corresponding to the bypass engaging voltage.

Furthermore, while an explanation is given above on an example in which the battery pack capacity adjustment apparatus is adopted in a hybrid car, it may instead be adopted in an electric car or a system other than a vehicle.

The disclosure of the following priority application is herein incorporated by reference:

Japanese Patent Application No. 2004-84757 filed Mar. 23, 2004.

What is claimed is:

1. A battery pack capacity adjustment apparatus for a battery pack constituted by connecting in series a plurality of cells, comprising:

capacity adjustment circuits each provided in correspondence to one of the plurality of cells to execute capacity adjustment by discharging the corresponding cell when a voltage at the corresponding cell exceeds a predetermined bypass engaging voltage;

a capacity adjustment decision-making unit that makes a decision as to whether or not capacity adjustment needs to be executed for the battery pack; and a target charging rate changing unit that raises a target charging rate for the battery pack from a first target charging rate to a second target charging rate when the capacity adjustment decision-making unit determines that the capacity adjustment needs to be executed for the battery pack.

2. A battery pack capacity adjustment apparatus according to claim 1, wherein:

the predetermined bypass engaging voltage has a voltage value higher than an average of voltages at the individual cells achieved by charging/discharging the battery pack at the first target charging rate and also equal to or lower than the average of the voltages at the individual cells achieved by charging/discharging the battery pack at the second target charging rate.

3. A battery pack capacity adjustment apparatus according to claim 1, wherein:

the capacity adjustment decision-making unit determines that the capacity adjustment needs to be executed for the battery pack if a ratio of a time length over which the capacity adjustment is executed by the capacity adjustment circuits to a time length over which the battery pack has been in use is equal to or lower than a predetermined ratio.

4. A battery pack capacity adjustment apparatus for a battery pack constituted by connecting in series a plurality of cells, comprising:

capacity adjustment means, provided in correspondence to one of the plurality of cells, for executing capacity adjustment by discharging the corresponding cell when a voltage at the corresponding cell exceeds a predetermined bypass engaging voltage;

a capacity adjustment decision-making means for making a decision as to whether or not capacity adjustment needs to be executed for the battery pack; and a target charging rate change means for raising a target charging rate for the battery pack from a first target charging rate to a second target charging rate when the capacity adjustment decision-making means determines that the capacity adjustment needs to be executed for the battery pack.

5. A battery pack capacity adjustment method for executing capacity adjustment for a plurality of cells constituting a battery pack by utilizing capacity adjustment circuits each provided in correspondence to one of the plurality of cells to discharge the corresponding cell when a voltage at the corresponding cell exceeds a predetermined bypass engaging voltage, comprising steps for:

making a decision as to whether or not capacity adjustment needs to be executed for the battery pack; and raising a target charging rate for the battery pack from a first target charging rate to a second target charging rate when the capacity adjustment of the battery pack is determined to be necessary.

* * * * *